(12) United States Patent
Miyakawa

(10) Patent No.: US 10,732,487 B2
(45) Date of Patent: Aug. 4, 2020

(54) ROTATION RESTRICTING STRUCTURE AND ILLUMINATION APPARATUS HAVING THE SAME

(71) Applicant: CANON KABUSHIKI KAISHA, Tokyo (JP)

(72) Inventor: Toshiki Miyakawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/404,036

(22) Filed: May 6, 2019

(65) Prior Publication Data
US 2019/0353983 A1    Nov. 21, 2019

(30) Foreign Application Priority Data

May 17, 2018   (JP) .................................. 2018-095126

(51) Int. Cl.
   *G03B 15/05*      (2006.01)
   *F21V 21/30*      (2006.01)

(52) U.S. Cl.
   CPC .............. *G03B 15/05* (2013.01); *F21V 21/30* (2013.01); *G03B 2215/0521* (2013.01); *G03B 2215/0578* (2013.01)

(58) Field of Classification Search
   CPC .............. G03B 15/05; G03B 2215/051; G03B 2215/0521; G03B 2215/0578; F21V 21/30; F21V 14/02; F21V 14/025
   See application file for complete search history.

(56) References Cited

U.S. PATENT DOCUMENTS

| | | | | |
|---|---|---|---|---|
| 2,876,868 | A | * | 3/1959 | Nerwin, Jr. ............. F16H 29/00 188/85 |
| 4,078,240 | A | * | 3/1978 | Kaneko .................. G03B 15/05 315/241 P |
| 6,370,987 | B1 | * | 4/2002 | Wilson, Jr. ............ B25B 21/002 192/46 |
| 10,113,726 | B1 | * | 10/2018 | Veloskey ................ F21V 21/30 |
| 2005/0111223 | A1 | * | 5/2005 | Lee ......................... F21L 14/00 362/269 |
| 2007/0014115 | A1 | * | 1/2007 | Katz ....................... F21V 21/30 362/382 |
| 2019/0093866 | A1 | * | 3/2019 | Thomas ................ F21V 21/145 |

FOREIGN PATENT DOCUMENTS

JP             5446946 B2     3/2014

* cited by examiner

*Primary Examiner* — Alan B Cariaso
(74) *Attorney, Agent, or Firm* — Cowan, Liebowitz & Latman, P.C.

(57) ABSTRACT

A rotation restricting structure includes a main body a rotator rotatable with respect to the main body, and a rotation restricting member which restricts rotation of the rotator, wherein the rotator includes a rotating plate which rotates with rotation of the rotator with respect to the main body, one of the rotating plate or the main body has a protrusion portion, the rotation restricting member has a contacting portion contactable with the protrusion portion and a rotational shaft which is pivotally supported by the other of the rotating plate or the main body, the protrusion portion contacts the contacting portion by rotation of the rotator, thereby the rotational angle range of the rotator being restricted, and a position of the contacting portion provided on the rotation restricting member is different from a position of the rotational shaft provided on the rotation restricting member.

9 Claims, 6 Drawing Sheets

ROTATION RESTRICTING STRUCTURE AND ILLUMINATION APPARATUS HAVING THE SAME

BACKGROUND OF THE INVENTION

Field of the Invention

The present invention relates to an illumination apparatus having a rotator which is rotatable in both right and left directions (i.e. both clockwise and anticlockwise rotations) in a horizontal direction with respect to a main body and has a bounce function which is capable of setting an angular range of rotation. Especially, the present invention relates to a restricting structure of the rotator.

Description of the Related Art

Conventionally, a light-emitting image capturing method (hereinafter referred to as bounce flash image capturing) has been known in which a light which an illumination apparatus emits is radiated toward a ceiling, a wall, and the like and an object is irradiated with the diffused reflective light. According to the bounce flash image capturing, the object is indirectly irradiated with the light from the illumination apparatus, so that depiction with soft light is enabled.

When an image is captured with a camera set in a normal position, it is necessary to rotate a light emitter of the illumination apparatus in a horizontal direction in order to bounce light from the light emitter on a wall. It is desirable that the light emitter can be rotated without any restriction to either a right direction or a left direction. However, since there are many wiring lines for electrically connecting a main body and a rotator of the light emitter in the illumination apparatus, it is not possible to freely rotate the rotator. Thus, it is desirable that the illumination apparatus is provided with a rotation restricting structure for restricting a rotation angle and the rotator is rotatable by 180 degrees without any restriction to either a right direction or a left direction. In addition, since a head portion is usually rotated by hand of a user, it is desirable, from a viewpoint of operability, that a rotation application force for rotating the head portion in a right direction is equal to a rotation application force for rotating the head portion in a left direction.

For instance, Japanese Patent No. 5446946 discloses an illumination apparatus which includes a main body and a rotation restricting structure for restricting an angular range of a rotator which rotates with respect to the main body. The rotator is rotatable by 180 degrees without any restriction to either a right direction or a left direction.

In Japanese Patent No. 5446946, in a state where a rotating plate provided with a protrusion portion is biased toward a light emitter side by a spring washer in the rotator which rotates in the light emitter side, the rotating plate and the spring washer are fixed to the rotator of the light emitter through a step screw. A cover in a controller side is provided with a locking portion which the protrusion portion of the rotating plate contacts. Two contact surfaces are provided on the locking portion. The two contact surfaces are arranged at different positions in a height direction of the illumination apparatus. The contact surfaces escape by a thickness of the protrusion portion of the rotating plate in the height direction. Thus, the rotator is rotatable by 180 degrees without any restriction to either a right direction or a left direction.

However, in the prior art disclosed in Japanese Patent No. 5446946, because the contact surfaces are different in the height direction, the rotating plate works so as to push down the spring washer in a product height direction in either one of the right and left directions, so that a rotation application force required in the right direction is different from a rotation application force required in the left direction.

SUMMARY OF THE INVENTION

The present invention provides an illumination apparatus having a rotation restricting structure which enables a rotator to rotate by 180 degrees in both right and left directions without changing the rotation application force in the right and left directions.

A rotation restricting structure as one aspect of the present invention includes a main body, a rotator which is rotatable with respect to the main body, and a rotation restricting member which restricts rotation of the rotator, wherein the rotator includes a rotating plate which rotates with rotation of the rotator with respect to the main body, one of the rotating plate or the main body has a protrusion portion, the rotation restricting member has a contacting portion which is contactable with the protrusion portion and a rotational shaft which is pivotally supported by the other of the rotating plate or the main body, the protrusion portion contacts the contacting portion by rotation of the rotator, thereby a rotational angle range of the rotator being restricted, and a position of the contacting portion provided on the rotation restricting member is different from a position of the rotational shaft provided on the rotation restricting member.

An illumination apparatus as another aspect of the present invention includes a light emitter, a main body, a rotator which is rotatable integrally with the light emitter with respect to the main body, and a rotation restricting member which restricts rotation of the rotator, wherein the rotator includes a rotating plate which rotates with rotation of the rotator with respect to the main body, one of the rotating plate or the main body has a protrusion portion, the rotation restricting member has a contacting portion which is contactable with the protrusion portion and a rotational shaft which is pivotally supported by the other of the rotating plate or the main body, the protrusion portion contacts the contacting portion by rotation of the rotator, thereby a rotational angle range of the rotator being restricted, and a position of the contacting portion provided on the rotation restricting member is different from a position of the rotational shaft provided on the rotation restricting member.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1:
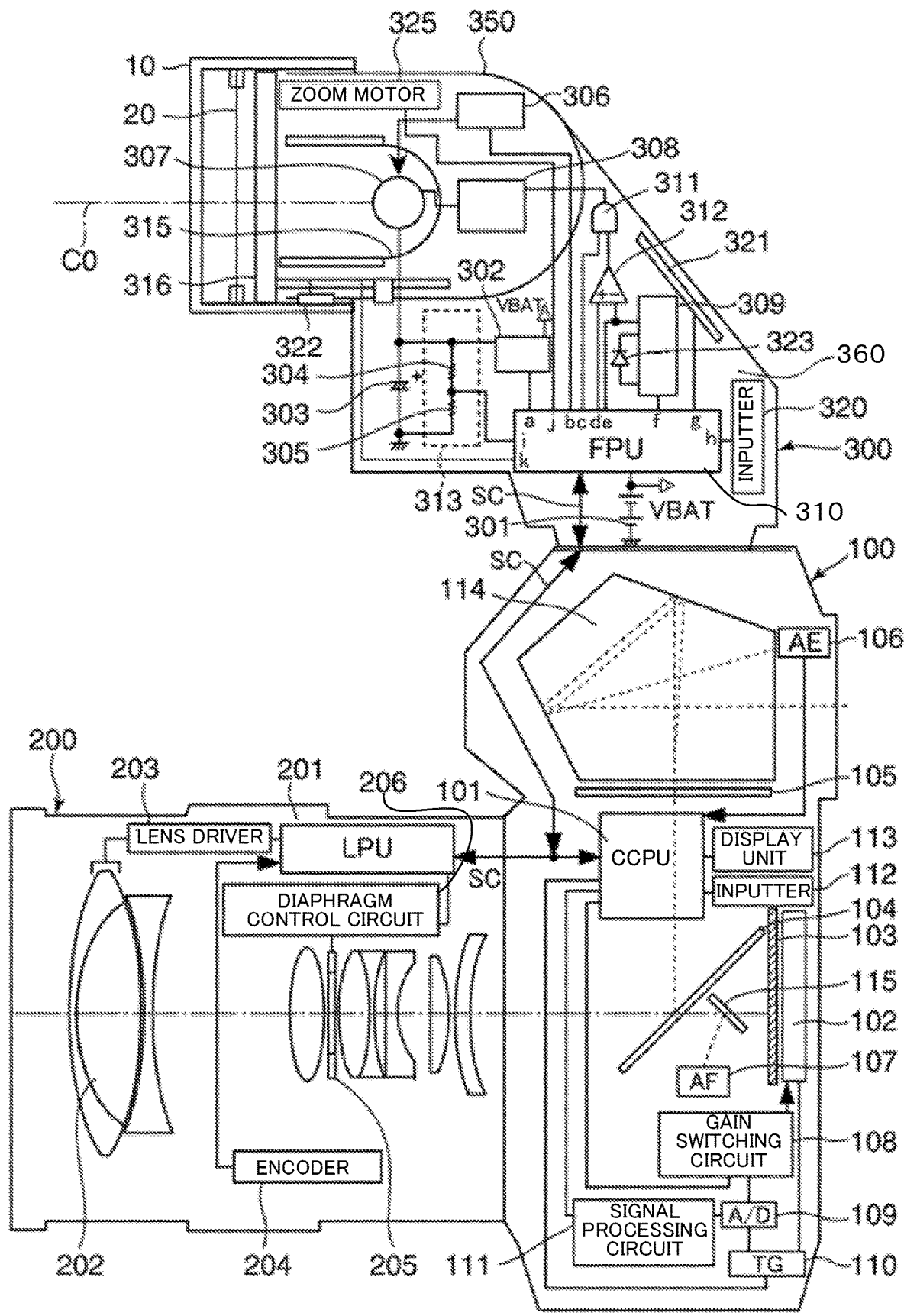
FIG. 1 is a block diagram showing a configuration of an image capturing system which includes the illumination apparatus.

FIG. 1 is a block diagram showing a configuration of an image capturing system including an illumination apparatus according to the first embodiment of the present invention. This image capturing system has a camera main body 100 which is an image capturing apparatus, a lens unit 200 detachable to the camera main body 100, and an electronic flash apparatus 300 which is an illumination apparatus detachable to the camera main body 100. It is noted that a vertical direction of the electronic flash apparatus 300 is a vertical direction in FIG. 1, a left side of FIG. 1 is a front side of the electronic flash apparatus 300, and a right side of FIG. 1 is a back side of the electronic flash apparatus 300. A bounce adapter 10 and a color filter 20 are detachably disposed at a front portion of a light emitter 350 of the electronic flash apparatus 300. The bounce adapter 10 can diffuse light. The color filter 20 can change color characteristics of light.

First, let us explain a configuration inside of the camera body 100. A camera microcomputer (CCPU) 101 controls each part of the camera main body 100. An image sensor 102 is an image sensor such as a CCD or a CMOS. A shutter 103 is driven so as to shield the image sensor 102 during non-image capturing and guide a light beam to the image sensor 102 during image capturing. A main mirror (half mirror) 104 reflects a part of light incident from a lens group 202, which will be described later, during non-image capturing to form an image on a focus plate 105. The image on the focus plate 105 is guided to an optical finder or the like via a pentaprism 114 and is used for checking an in-focus state of an object. A photometric circuit 106 has a photometric sensor (AE sensor) and a focus detection circuit 107 has a focus detection sensor (AF sensor). A gain switching circuit 108 switches an amplification gain of a signal from the image sensor 102.

An A/D converter 109 converts an amplified analog signal from the image sensor 102 into a digital signal. A timing generator (TG) 110 synchronizes a conversion timing of the A/D converter 109 with the signal from the image sensor 102. A signal processing circuit 111 performs image processing including a white balance control for image data converted into the digital signal by the A/D converter 109. A signal line SC is a communication line at an interface between the camera main body 100, and the lens unit 200 and the electronic flash apparatus 300. An inputter 112 includes various operation units such as a release switch for starting image capturing. A display unit 113 displays various settings, image capturing information, and the like. The pentaprism 114 guides a light beam incident from the lens group 202 and reflected by the main mirror 104 to the AE sensor and the optical finder in the photometric circuit 106.

A sub mirror 115 guides a light beam incident from the lens group 202 and transmitted through a translucent center portion of the main mirror 104 to the AF sensor of the focus detection circuit 107.

Next, let us explain a configuration and operation inside of the lens unit 200. A lens microcomputer (LPU) 201 controls an operation of each part of the lens unit 200. A lens group 202 is composed of a plurality of lenses, and a lens driver 203 moves the lens group 202 in accordance with instructions such as focus adjustment, change in a focal length, and the like from the lens microcomputer 201. An encoder 204 detects a position of the lens group 202 or a driving amount of the lens group 202. A diaphragm 205 adjusts an amount of light incident on the image sensor 102 by changing an aperture diameter, and is controlled by the lens microcomputer 201 via a diaphragm control circuit 206.

Next, let us explain a configuration of the electronic flash apparatus 300 as an illumination apparatus. A main body of the electronic flash apparatus is provided with an electronic flash microcomputer (FPU) 310, an inputter 320, and a display unit 321. The main body is further provided with a battery 301, a pressor circuit 302, a main capacitor 303, a resistor 304, a resistor 305, an integrating circuit 309, an AND gate 311, a comparator 312, a voltage detecting circuit 313, a photodiode 323, and the like. A light emitter 350 is disposed on a front portion (object side) of the electronic flash apparatus 300. The light emitter 350 is connected to the main body by a not-shown hinge mechanism, and is rotatable in vertical and horizontal directions for bounce image capturing.

The light emitter 350 mainly includes a trigger circuit 306, a discharge tube 307, a light emission control circuit 308, a reflective umbrella 315, a Fresnel lens 316, an accessory determiner 322, a zoom motor 325, and the like. The trigger circuit 306 is connected to the electronic flash microcomputer 310 and outputs a trigger voltage when receiving a trigger signal from the electronic flash microcomputer 310 when the discharge tube 307 emits light. The discharge tube 307 is a main light source that is excited by receiving a trigger voltage of several KV applied from the trigger circuit 306 and emits light using an energy charged in the main capacitor 303. The light emission control circuit 308 controls light emission of the discharge tube 307.

The reflective umbrella 315 reflects light emitted from the discharge tube 307 to a radiation direction of the light emitter 350 (in front of an optical axis CO). The Fresnel lens 316 is an irradiator which reduces unevenness of light emitted from the discharge tube 307 and broadens the irradiation range of the light emitted from the discharge tube 307. The flash light emitted from the discharge tube 307 is reflected by the reflective umbrella 315, and the Fresnel lens 316 controls a light distribution of the light beam. By changing a distance between the reflective umbrella 315 and the Fresnel lens 316 to a predetermined position, it is possible to change a guide number and the light distribution. The zoom motor 325 is composed of a zoom circuit and an encoder, and moves the reflective umbrella 315 and the discharge tube 307 to a predetermined position. The inputter 320 includes various operation units for inputting settings and the like of the electronic flash apparatus 300. The display unit 321 displays various states and the like of the electronic flash apparatus 300.

The electronic flash microcomputer 310 controls an operation of each part of the electronic flash apparatus 300. The electronic flash microcomputer 310 is realized by a microcomputer built-in one chip IC circuit including, for example, a CPU, a ROM, a RAM, an input-output control circuit (I/O control circuit), a multiplexer, a timer circuit, an EEPROM, an A/D converter, a D/A converter, and the like. An accessory determiner 322 is a detector that detects whether or not a bounce adapter 10 and a color filter 20 that are detachable with respect to the light emitter 350 are attached. Based on a detection result of the accessory determiner 322, the electronic flash microcomputer 310 determines whether or not the bounce adapter 10 and the color filter 20 are attached.

Figures 2A, 2B:
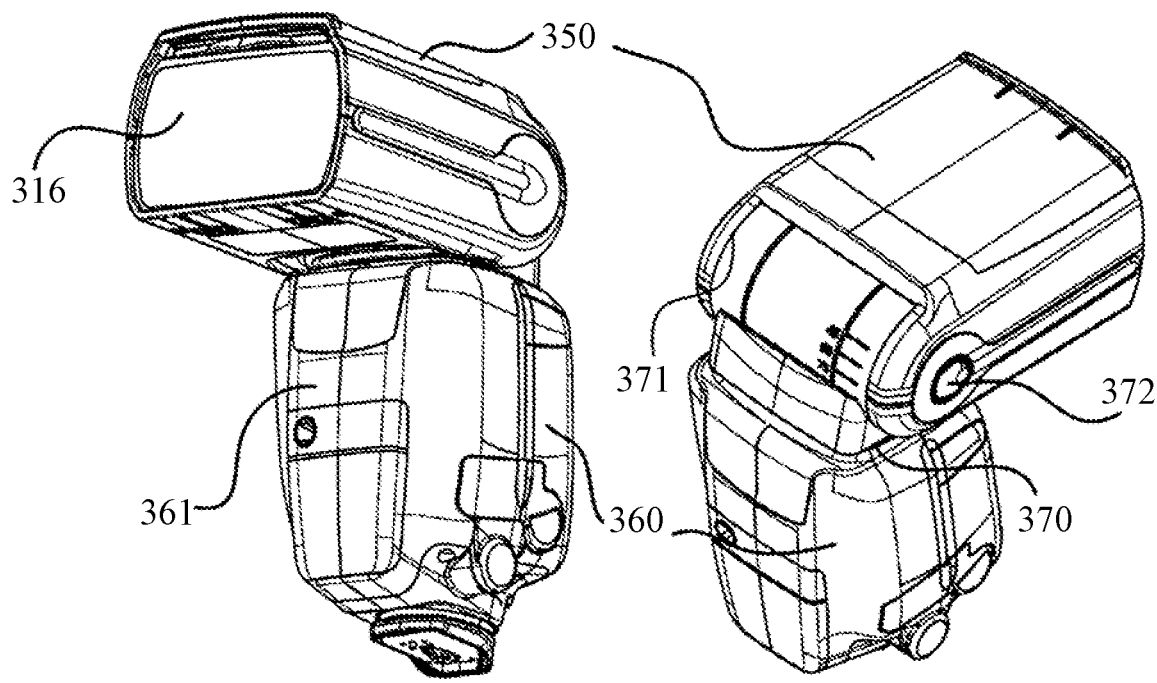
FIG. 2A is an external view of the illumination apparatus, showing a state where the light emitter is set in a normal position.
FIG. 2B is an external view of the illumination apparatus, showing a state where the light emitter is rotated by 180 degrees in the horizontal direction (180-degree bounce state).

FIGS. 2A and 2B are external views of the illumination apparatus, FIG. 2A shows a state in which the light emitter is in a normal position, and FIG. 2B shows a state in which the light emitter is bounced by 180 degrees in the horizontal direction.

The electronic flash apparatus 300 is composed of a controller (main body) 360 and the light emitter 350. The light emitter 350 is rotatably connected to the controller 360 via a vertical rotator 371 that is rotatable in the vertical direction with respect to the controller 360 and a horizontal rotator 370 that is rotatable in the horizontal direction with respect to the controller 360.

In image capturing by the camera 100 in the normal position state, when the horizontal rotator 370 is rotated, it is possible to perform wall bounce image capturing in which electronic flash light emitted from the Fresnel lens 316 is reflected on the wall, and when the vertical rotator 371 is rotated, it is possible to perform ceiling bounce image capturing in which electronic flash light emitted from the Fresnel lens 316 is reflected on the ceiling. When the light emitter 350 is horizontally rotated or vertically rotated from the normal position state of the electronic flash apparatus 300 with the light emitter 350 facing the front, it is necessary to push an unlock button 372 provided on the light emitter 350. By providing the unlock button 372, the light emitter 350 is not easily rotated due to vibration, impact, or the like.

Figure 3:
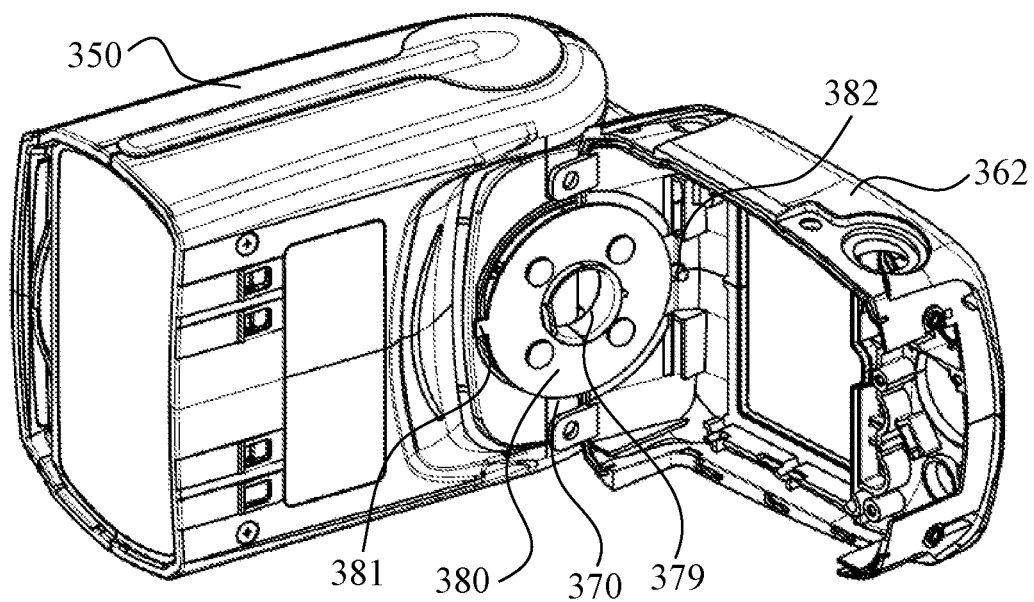
FIG. 3 is a disassembled perspective view showing a structure around a rotating plate 380.

FIG. 3 is a perspective view showing the light emitter 350 of the electronic flash apparatus 300 in a disassembled state.

A rotating plate 380 having a protrusion portion 381 is screwed in the horizontal rotator 370 and this protrusion portion 381 is capable of contacting a rotation restricting eccentric member (hereinafter referred to as a rotation restricting member) 382 described later, so that horizontal rotation of the light emitter 350 is restricted.

A shaft hole 379 is formed in a center of the horizontal rotator 370, and lead wires (not shown) extending from the aforementioned various electric components and circuit board of the light emitter 350 through the shaft hole 379 are connected to the above-mentioned various electric components and circuit board of the controller 360.

Figure 4:
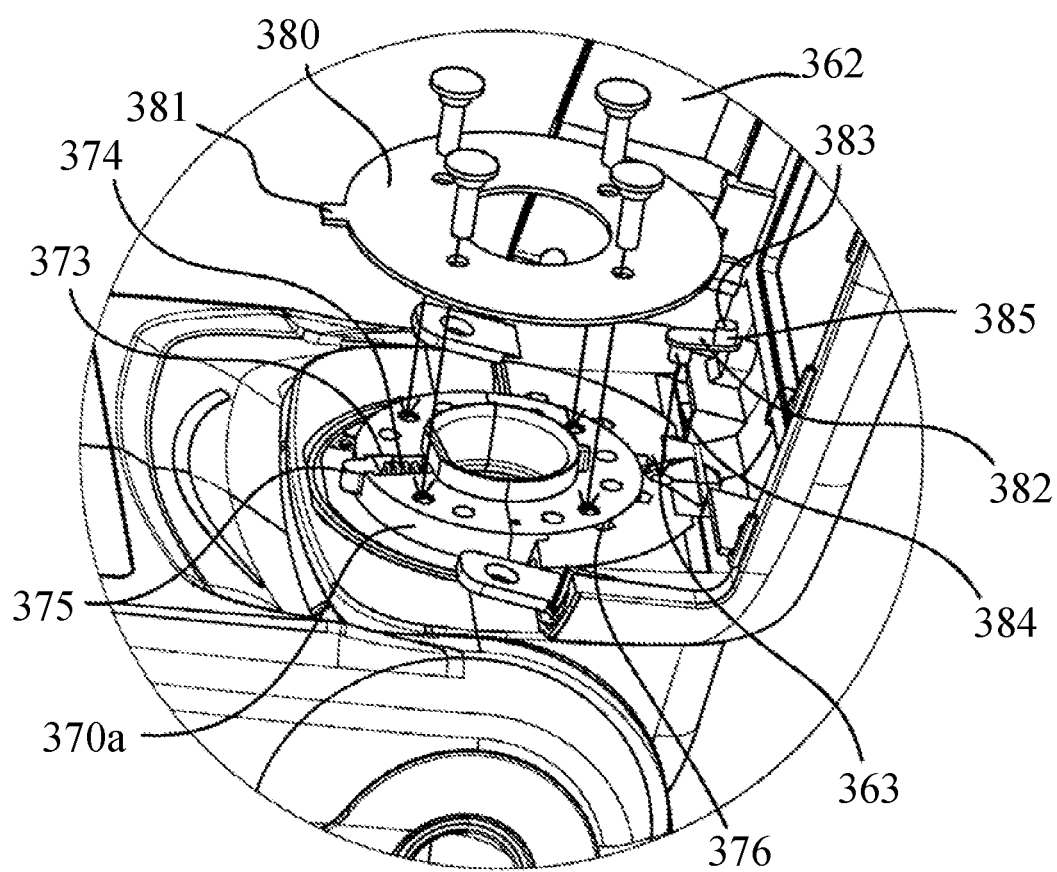
FIG. 4 is an enlarged view showing the structure around the rotating plate 380.

FIG. 4 is an enlarged view of the horizontal rotator 370.

The horizontal rotation shaft 370a formed in the horizontal rotator 370 is pivotally supported by being pinched by a rear cover 362 and a front cover 361 which are an exterior housing of the controller 360 and by being retained by the rotating plate 380. A shaft hole 363 for pivotally supporting the rotation restricting member 382 is provided on the rear cover 362 at a position eccentric from the center of the horizontal rotator 370 and a rotational shaft 384 of the rotation restricting member 382 is inserted into the shaft hole 363. In a case where a stopper which the protrusion portion 381 contacts is fixed, a rotation width of the horizontal rotator 370 is limited by a width of the protrusion portion 381. Therefore, when the light emitter 350 is horizontally rotated, the light emitter 350 can be rotated by 180 degrees in one direction, but the light emitter 350 can be rotated by less than 180 degrees in the other direction because the rotation width of the horizontal rotator 370 is limited by the width of the protrusion portion 381.

In a case of this configuration, a contacting portion serving as the stopper is the rotation restricting member 382. A contacting shaft 383 having a contacting portion 385 located at a position eccentric from the rotational shaft 384 (that is, different from a position at which the rotational shaft 384 is located) rotates by the width of the protrusion portion 381, so that the light emitter 350 can be rotated by 180 degrees in both directions. Although the shaft hole 363 is provided on the rear cover 362 in this embodiment, the same effect can be obtained even if it is provided on the front cover 361. In addition, since there is no element which changes rotation application force in horizontal rotation of the right and left directions, the rotation application force becomes equal in both the left and right rotations, so that a user can perform the horizontal rotation operation without feeling uncomfortable. A protrusion groove 373 is formed in a radial direction in a part of an outer circumference of the horizontal rotational shaft 370a, and a spring 374 and a protrusion 375 are inserted through the protrusion groove 373. Click grooves 376 are formed at a predetermined angle on sliding surfaces of the front cover 361 and the rear cover 362 which are in contact with the horizontal rotational shaft 370a. When the light emitter 350 horizontally rotates, the protrusion 375 is inserted into one of the click grooves 376, so that the user feels a click feeling and the light emitter 350 is positioned at a desired angle.

The rotation restricting member 382 may be formed with a molding material or may be made of a metal material. Alternatively, the rotation restricting member 382 may be formed by swaging a metal shaft to a sheet metal.

Figures 5A, 5B:
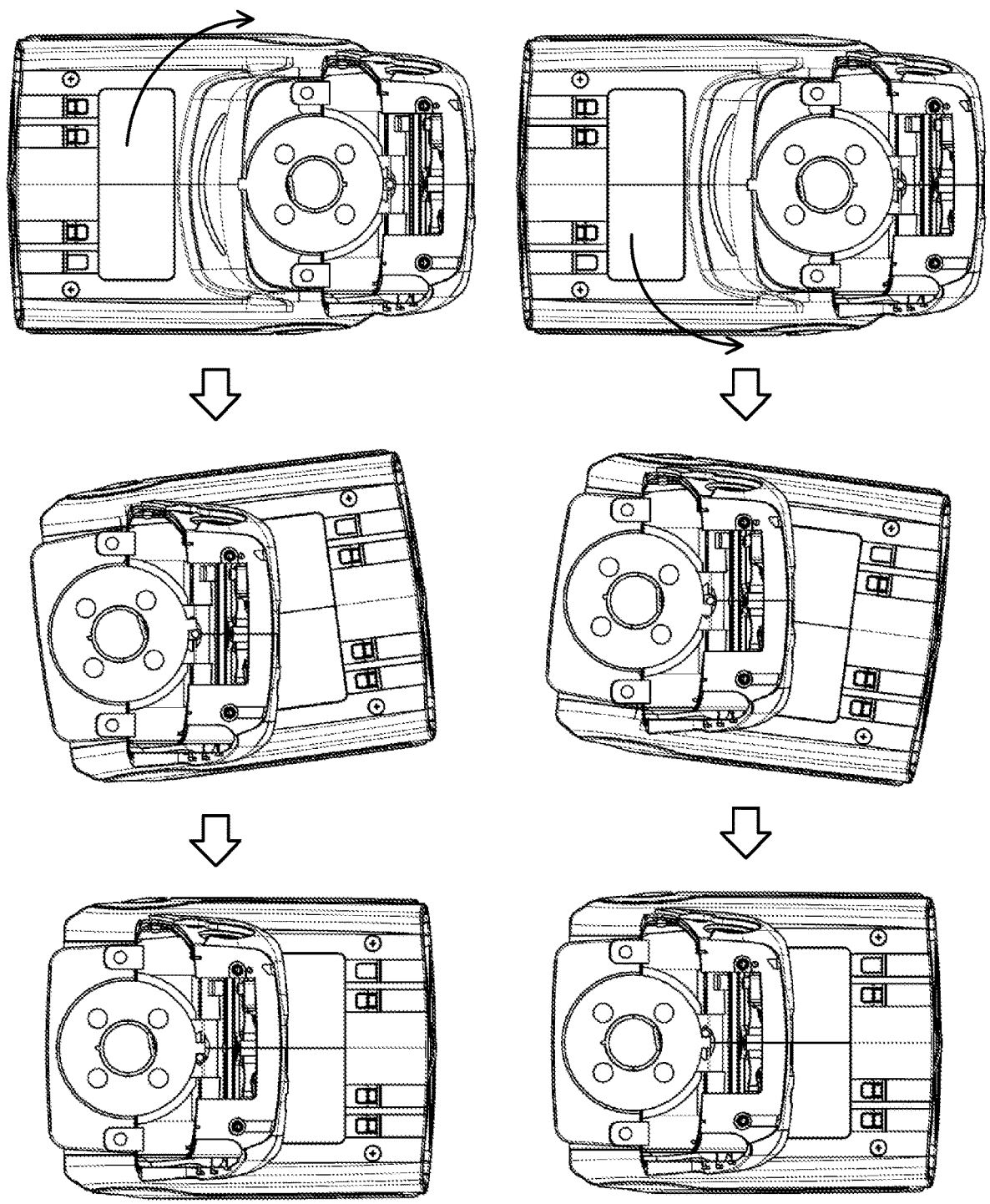
FIGS. 5A and 5B are diagrams showing a relationship between the rotating plate 380 and a rotation restricting member 382 during horizontal rotation.

FIGS. 5A and 5B show a movement of the light emitter 350, the rotating plate 380, and the rotation restricting member 382 during horizontal rotation. FIG. 5A shows a case where the electronic flash apparatus 300 is seen from the bottom with the light emitter 350 rotated clockwise. When the light emitter 350 is rotated by 180 degrees, the rotation restricting member 382 rotates and retracts by the width of the protrusion portion 381 around the rotation shaft 384. Also, as shown in FIG. 5B, when the light emitter 350 is rotated anticlockwise, the light emitter 350 can be rotated by 180 degrees in the same way because the rotation restricting member 382 rotates and retracts by the width of the protrusion portion 381 around the rotation shaft 384. When a contacting surface of the protrusion portion 381 contacts the contacting portion 385 of the contacting shaft 383, the contacting portion 385 also contacts an outer periphery of the rotating plate 380, so that the rotation restricting member 382 acts as a stopper.

Second Embodiment

Figure 6:
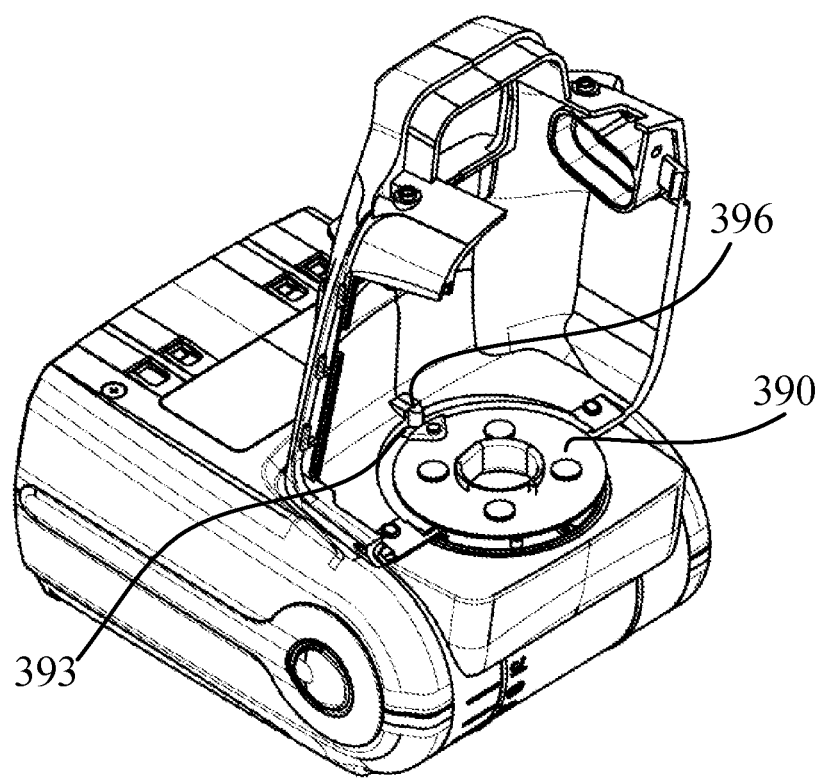
FIG. 6 is a disassembled perspective view showing a structure around a rotating plate 390 in the second embodiment.
Figure 7:
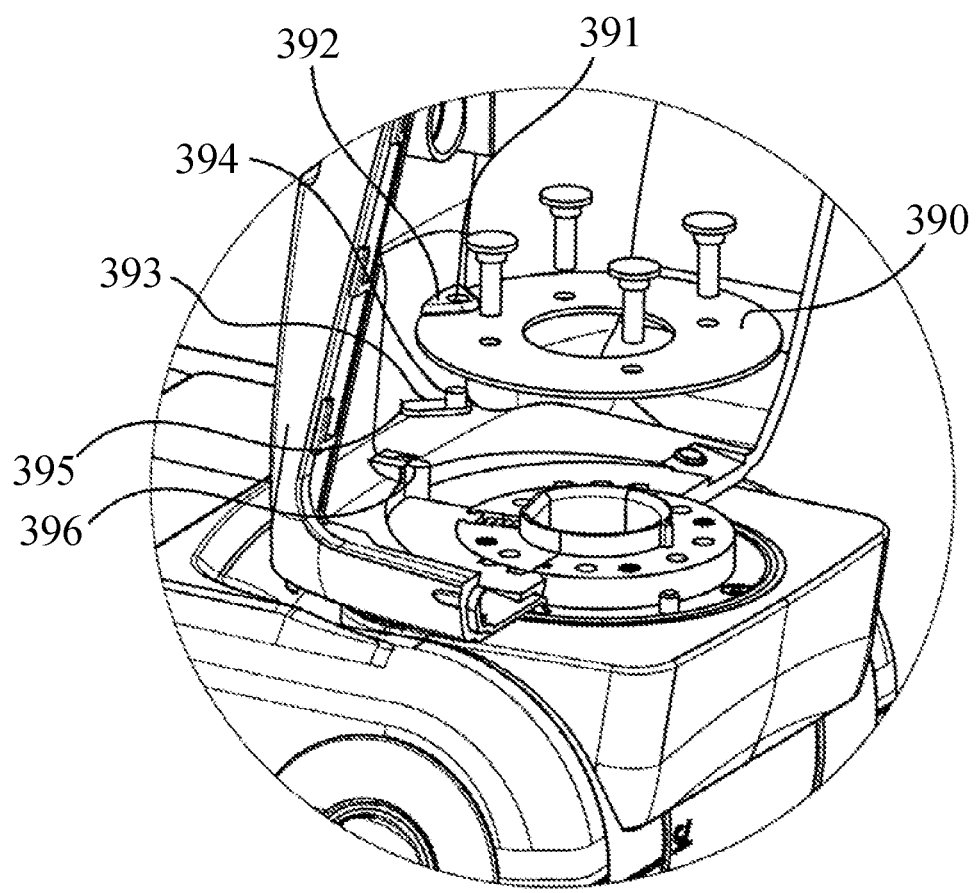
FIG. 7 is an enlarged view showing a structure around the rotating plate 390 in the second embodiment

Hereinafter, with reference to FIGS. 6 and 7, let us explain a rotation restricting structure of the electronic flash apparatus 300 according to the second embodiment of the present invention.

In the above embodiment, the rotation restricting structure has been realized by pivotally supporting the rotational shaft 384 of the rotation restricting member 382 in the front cover 361 or the rear cover 362 and providing the protrusion 381 on the rotating plate 380. As shown in FIGS. 6 and 7, in the second embodiment, a protrusion portion (protrusion rib) 396 serving as a stopper is provided on a side of the front cover 361 and a rotation restricting member 393 is pivotally supported in a rotating plate 390, so that it is possible to obtain the same effect as the first embodiment. The protrusion portion 396 may be provided on a side of the rear cover 362. The rotation restricting member 393 has a rotational shaft 394 for pivotally supporting the rotational restricting member 393 in the rotating plate 390 and a contacting portion 395 provided at a position different from a position at which the rotational shaft 394 is provided, and the rotation restricting member 393 rotates around the rotational shaft 394.

The rotating plate 390 is provided with a shaft hole (hole portion) 391 for pivotally supporting the rotation restricting member 393. Further, by making a shape of a peripheral portion of a shaft hole a drawing shape 392, the rotation restricting member 393 can be sandwiched between the rotating plate 390 and the front cover 361 or the rear cover 362, which can prevent the rotation restricting member 393 from falling off. Further, a standing wall of the drawing shape 392 and a side surface of the rotation restricting member 393 contact with each other, thereby rotation of the rotation restricting member 393 being restricted.

When the light emitter 350 tries to be horizontally rotated from the normal position by 180 degrees, the contacting portion 395 of the rotation restricting member 393 contacts with the protrusion portion 396 before the 180-degree rotation is completed. However, the rotation restricting member 393 rotates around the rotational shaft 394 by the width of the contacting portion 395 of the rotation restricting member 393 to realize a 180-degree bounce. Likewise, when the light emitting part 350 tries to be horizontally rotated in the reverse direction by 180 degrees, the contacting portion 395 of the rotation restricting member 393 contacts the protrusion portion 396 before the 180-degree reverse rotation is completed. Since the rotation restricting member 393 rotates by the width of the contacting portion 395 of the rotation restricting member 393 around the rotational shaft 394, the 180-degree bounce is realized. Also, since there is no element which changes rotational application force as with the case of the first embodiment, the rotation application force becomes equal in both the left and right rotations, so that the user can also perform the horizontal rotation operation without feeling uncomfortable.

In this manner, in each embodiment, a rotation restricting structure comprises: a main body (360); a rotator (370) which is rotatable with respect to the main body; and a rotation restricting member (382, 393) which restricts rotation of the rotator, wherein the rotator includes a rotating plate (380, 390) which rotates with rotation of the rotator with respect to the main body, one of the rotating plate or the main body has a protrusion portion (381, 396), the rotation restricting member has a contacting portion (385, 395) which is contactable with the protrusion portion and a rotational shaft (384, 394) which is pivotally supported by the other of the rotating plate or the main body, the protrusion portion contacts the contacting portion by rotation of the rotator, thereby the rotational angle range of the rotator being restricted, and a position of the contacting portion provided on the rotation restricting member is different from a position of the rotational shaft provided on the rotation restricting member.

Preferably, the protrusion portion is contactable with the contacting portion by rotation of the rotator with respect to the main body both in a first direction and in a second direction opposite to the first direction.

Preferably, in a case where the one of the rotating plate or the main body is the rotating plate and the other is the main body, when the protrusion portion contacts the contacting portion by rotation of the rotator, the rotation restricting member rotates by a width of the protrusion portion around the rotation shaft.

Preferably, in a case where the one of the rotating plate or the main body is the main body and the other is the rotating plate, when the contacting portion contacts the protrusion portion by rotation of the rotator, the rotation restricting member rotates by a width of the contacting portion around the rotation shaft.

Preferably, the one of the rotating plate or the main body is the rotating plate and the other is the main body, when the protrusion portion contacts the contacting portion by rotation of the rotator, the contacting portion contacts an outer periphery of the rotating plate, thereby the rotation restricting member serving as a stopper.

Preferably, the one of the rotating plate or the main body is the main body and the other is the rotating plate, a drawing shape is formed in a peripheral portion, which is provided on the rotating plate, of a shaft hole for pivotally supporting the rotational shaft, and the rotation restricting member is sandwiched between the main body and the drawing shape of the rotating plate and a rotational range of the rotation restricting member is restricted by the drawing shape.

Preferably, the rotation restricting member enables 180-degree rotation of the rotator with respect to the main body in both a first direction and a second direction opposite to the first direction.

Preferably, a rotation application force required to rotate the rotator in a first direction with respect to the main body is equal to a rotational actuating force required to rotate the rotator in a second direction opposite to the first direction.

According to the above embodiments, the present invention can an illumination apparatus in which a rotator is rotatable by 180 degrees with rotary torques in both right and left directions being equal to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095126, filed on May 17, 2018, which is hereby incorporated by reference herein in its entirety.

What is claimed is:

1. A rotation restricting structure comprising:
   a main body;
   a rotator which is rotatable with respect to the main body; and
   a rotation restricting member which restricts rotation of the rotator,
   wherein
     the rotator includes a rotating plate which rotates with rotation of the rotator with respect to the main body,
     one of the rotating plate or the main body has a protrusion portion,
     the rotation restricting member has a contacting portion which is contactable with the protrusion portion and a rotational shaft which is pivotally supported by the other of the rotating plate or the main body,
     the protrusion portion contacts the contacting portion by rotation of the rotator, thereby a rotational angle range of the rotator being restricted, and
     a position of the contacting portion provided on the rotation restricting member is different from a position of the rotational shaft provided on the rotation restricting member.

2. The rotation restricting structure according to claim 1, wherein the protrusion portion is contactable with the contacting portion by rotation of the rotator with respect to the main body both in a first direction and in a second direction opposite to the first direction.

3. The rotation restricting structure according to claim 1, wherein
in a case where the one of the rotating plate or the main body is the rotating plate and the other is the main body,
when the protrusion portion contacts the contacting portion by rotation of the rotator, the rotation restricting member rotates by a width of the protrusion portion around the rotation shaft.

4. The rotation restricting structure according to claim 1, wherein
in a case where the one of the rotating plate or the main body is the main body and the other is the rotating plate,
when the contacting portion contacts the protrusion portion by rotation of the rotator, the rotation restricting member rotates by a width of the contacting portion around the rotation shaft.

5. The rotation restricting structure according to claim 1, wherein
in a case where the one of the rotating plate or the main body is the rotating plate and the other is the main body,
when the protrusion portion contacts the contacting portion by rotation of the rotator, the contacting portion contacts an outer periphery of the rotating plate, thereby the rotation restricting member serving as a stopper.

6. The rotation restricting structure according to claim 1, wherein
in a case where the one of the rotating plate or the main body is the main body and the other is the rotating plate,
a drawing shape is formed in a peripheral portion of a shaft hole for pivotally supporting the rotational shaft, the peripheral portion being provided on the rotating plate, and
the rotation restricting member is sandwiched between the main body and the drawing shape of the rotating plate and a rotational range of the rotation restricting member is restricted by the drawing shape.

7. The rotation restricting structure according to claim 1, wherein the rotation restricting member enables 180-degree rotation of the rotator with respect to the main body in both a first direction and a second direction opposite to the first direction.

8. The rotation restricting structure according to claim 1, wherein a rotation application force required to rotate the rotator in a first direction with respect to the main body is equal to a rotational actuating force required to rotate the rotator in a second direction opposite to the first direction.

9. An illumination apparatus comprising:
a light emitter;
a main body;
a rotator which is rotatable integrally with the light emitter with respect to the main body; and
a rotation restricting member which restricts rotation of the rotator,
wherein
the rotator includes a rotating plate which rotates with rotation of the rotator with respect to the main body,
one of the rotating plate or the main body has a protrusion portion,
the rotation restricting member has a contacting portion which is contactable with the protrusion portion and a rotational shaft which is pivotally supported by the other of the rotating plate or the main body,
the protrusion portion contacts the contacting portion by rotation of the rotator, thereby a rotational angle range of the rotator being restricted, and
a position of the contacting portion provided on the rotation restricting member is different from a position of the rotational shaft provided on the rotation restricting member.

* * * * *